(12) United States Patent
Garvey et al.

(10) Patent No.: US 12,032,918 B1
(45) Date of Patent: Jul. 9, 2024

(54) AGENT BASED METHODS FOR DISCOVERING AND DOCUMENTING USER EXPECTATIONS

(71) Applicant: Wevo, Inc., Boston, MA (US)

(72) Inventors: Dustin Garvey, Exeter, NH (US); Charlie Hoang, Boston, MA (US); Alexa Stewart, Andover, MA (US); Janet Muto, Boston, MA (US); Nitzan Shaer, Boston, MA (US); Andrea Paola Aguilera García, Cambridge, MA (US); Jon Andrews, Boston, MA (US); Frank Chiang, Boston, MA (US)

(73) Assignee: Wevo, Inc., Boston, MA (US)

( * ) Notice: Subject to any disclaimer, the term of this patent is extended or adjusted under 35 U.S.C. 154(b) by 0 days.

(21) Appl. No.: 18/240,627

(22) Filed: Aug. 31, 2023

(51) Int. Cl.
*G06F 40/40* (2020.01)
(52) U.S. Cl.
CPC .................................. *G06F 40/40* (2020.01)
(58) Field of Classification Search
None
See application file for complete search history.

(56) References Cited

U.S. PATENT DOCUMENTS

| | | | |
|---|---|---|---|
| 8,462,996 B2 | 6/2013 | Moon et al. | |
| 10,942,625 B1 | 3/2021 | Li et al. | |
| 11,250,069 B1 | 2/2022 | Bianchi et al. | |
| 11,893,358 B1* | 2/2024 | Lakshmikanthan | G06F 16/3329 |
| 2010/0138808 A1* | 6/2010 | Kim | G06F 8/10 717/104 |
| 2011/0167054 A1* | 7/2011 | Bailey | G06F 16/358 707/E17.108 |
| 2013/0246382 A1* | 9/2013 | Cantrell | G06F 16/90 707/706 |
| 2013/0268534 A1* | 10/2013 | Mathew | G06F 16/35 707/740 |
| 2015/0095017 A1 | 4/2015 | Mnih et al. | |
| 2015/0363388 A1* | 12/2015 | Herdagdelen | G06F 40/263 704/9 |
| 2017/0132676 A1* | 5/2017 | Mediratta | G06Q 30/0282 |
| 2017/0242919 A1* | 8/2017 | Chandramouli | G06F 16/3344 |

(Continued)

OTHER PUBLICATIONS

Kang et al., "Continual Retraining of Keystroke dynamics Based Authenticator", International Conference on Biometrics—ICB2007, pp. 1203-1211 (Year: 2007).

(Continued)

*Primary Examiner* — Neeraj Sharma
(74) *Attorney, Agent, or Firm* — Invoke

(57) ABSTRACT

Techniques are described herein for using artificial intelligence to select, curate, normalize, enrich, and synthesize the results of user experience (UX) tests. In some embodiments, a system identifies a set of unstructured textual elements associated with one or more UX tests. The system may configure agents using generative language model services, including a reviewing agent that reviews and edit outputs of a machine learning classification model applied to the unstructured textual elements and/or a curating agent that selects unstructured textual elements to represent themes within the user experience test classified using the machine learning classification model. The outputs may be used to enhance the scalability, function, and efficiency of applications directed at improving product designs.

20 Claims, 8 Drawing Sheets

(56) References Cited

U.S. PATENT DOCUMENTS

| | | | |
|---|---|---|---|
| 2017/0308960 A1 | 10/2017 | Mascaro et al. | |
| 2018/0046570 A1 | 2/2018 | Kaulgud et al. | |
| 2018/0174070 A1 | 6/2018 | Hoffman et al. | |
| 2018/0196796 A1 | 7/2018 | Wu | |
| 2018/0315494 A1 | 11/2018 | Kolde et al. | |
| 2019/0050875 A1 | 2/2019 | McCord | |
| 2020/0004564 A1 | 1/2020 | Calegari et al. | |
| 2020/0050949 A1* | 2/2020 | Sundararaman | G06F 40/284 |
| 2020/0065389 A1 | 2/2020 | Lu et al. | |
| 2020/0175039 A1* | 6/2020 | Bhadury | G06F 16/9535 |
| 2020/0226479 A1 | 7/2020 | Germanakos et al. | |
| 2020/0279017 A1 | 9/2020 | Norton et al. | |
| 2020/0311214 A1* | 10/2020 | Chatterjee | G06N 20/00 |
| 2021/0150594 A1 | 5/2021 | Zhu et al. | |
| 2021/0407312 A1 | 12/2021 | Mestres et al. | |
| 2022/0050877 A1 | 2/2022 | Kang et al. | |
| 2022/0067763 A1 | 3/2022 | Lee | |
| 2022/0092651 A1 | 3/2022 | Sureshkumar et al. | |
| 2022/0198157 A1* | 6/2022 | Li | G06F 40/58 |
| 2022/0374597 A1 | 11/2022 | Bellegarda et al. | |
| 2022/0398635 A1 | 12/2022 | Jungmeisteris et al. | |
| 2023/0025371 A1 | 1/2023 | Syed et al. | |
| 2023/0085195 A1 | 3/2023 | Karri et al. | |
| 2023/0098783 A1* | 3/2023 | Zaremoodi | G10L 15/183 704/243 |
| 2023/0161972 A1* | 5/2023 | Härmä | G06N 3/047 704/9 |
| 2023/0244968 A1* | 8/2023 | Gurin | G06N 5/043 706/11 |

OTHER PUBLICATIONS

Berends, Jasper, et al. "Specifying and Testing Conversational User Interfaces." (2017). (Year: 2017).

\* cited by examiner

AGENT BASED METHODS FOR DISCOVERING AND DOCUMENTING USER EXPECTATIONS

TECHNICAL FIELD

The present disclosure relates, generally, to user experience testing. In particular, the present disclosure relates to selecting, curating, normalizing, enriching, and synthesizing the results of user experience tests using artificial intelligence (AI) systems and processes.

BACKGROUND

User experience (UX) design encompasses tools and applications for optimizing how users interact with a system, which may be comprised of physical and/or digital interfaces. Component tools allow designers and researchers to compose and administer UX tests, the results of which may be processed to assess and understand user experiences with a product. For example, the component tools may allow a user to compose and administer a survey or questionnaire that prompts a sample set of users to describe and/or otherwise evaluate the user's experience with a product. A UX test may also be composed to monitor and capture various metrics associated with a user's interaction with a product, such as how long it takes the user to perform a certain task and how long a user engages with the product. Test results may include qualitative and quantitative data that provide insights into user experiences with a product. Such insights may help isolate problematic areas of a product's design and guide product design updates to improve the overall experience when using a product.

User researchers and product designers generally have two options when performing UX testing. The first is to compose and administer the tests using existing or custom-built frameworks. For example, a framework may allow users to create custom survey questions and target a panel with particular demographics. In this scenario, the researcher bears the burden of determining how the tools should be composed and how the results should be analyzed. The researcher may not have the time or expertise to effectively run UX tests and identify the highest-quality test results. Poorly crafted tests and analysis may lead to suboptimal product design choices and the inefficient use of resources.

Researchers may also outsource UX testing to a third-party service provider. In this scenario, the service provider may use proprietary tools to perform the UX tests and analyze the results. Third-party service providers may leverage their expertise in conducting and administering tests. However, it may be difficult for service providers to identify the test results that are most relevant to the specific customer. The analysis is often decomposed into manual tasks that are tightly coupled to the specific customer. As a result, extracting useful and actionable insights is typically an expensive, cumbersome, and inefficient process.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
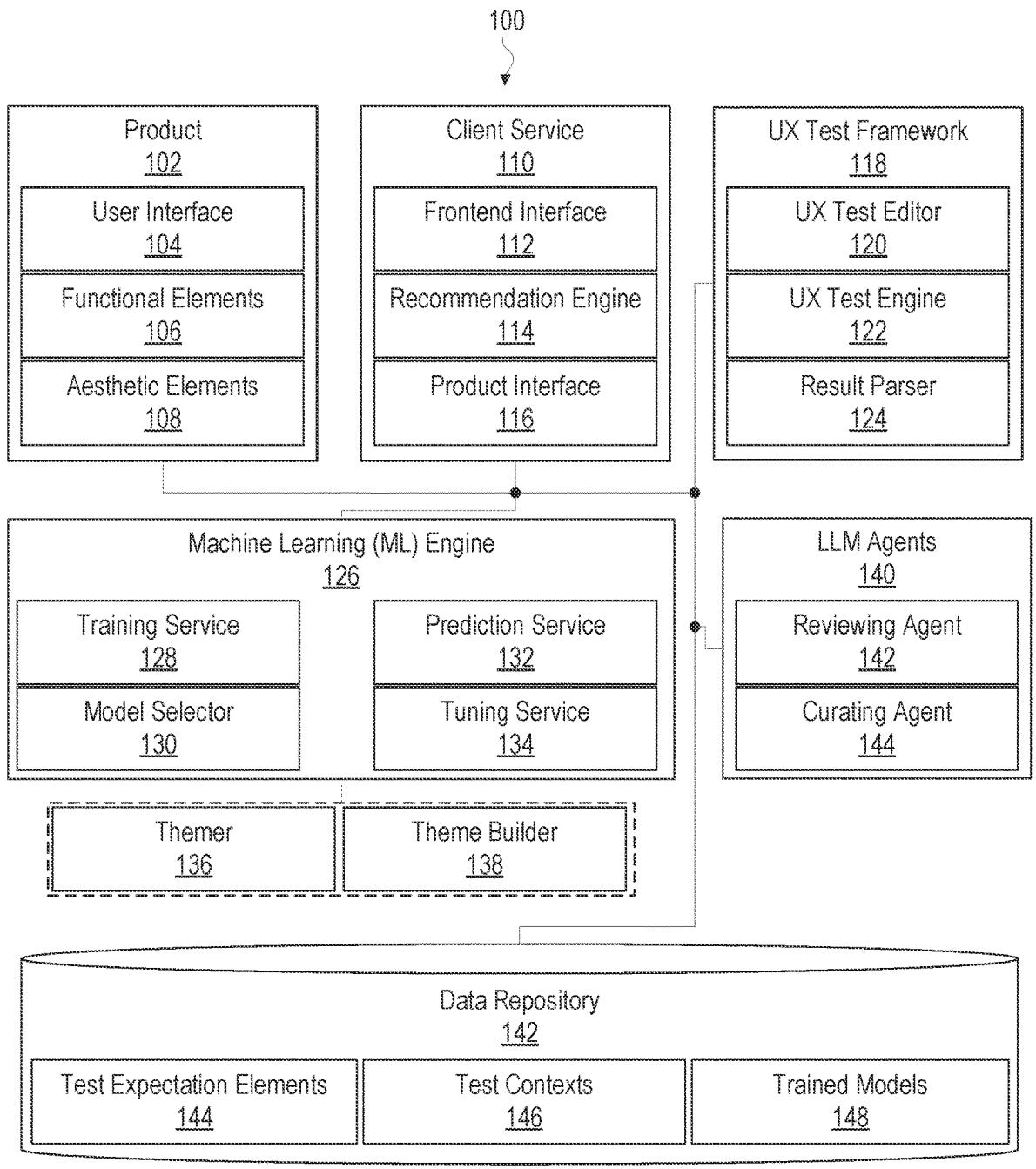
FIG. 1 illustrates a system architecture for discovering and documenting user expectations in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

Techniques are described herein for using artificial intelligence (AI) based systems and methods to select, curate, normalize, enrich, and synthesize the results of user experience (UX) tests. The techniques may automate one or more aspects of UX testing, increasing the scalability of UX testing systems and methodologies. The techniques may further provide insights into UX test results that are not readily apparent from the raw result data. The insights may be used to render user interfaces and/or to trigger other system actions, which may optimize product design feedback, analysis, and development process flows.

In some embodiments, a system receives, normalizes, and synthesizes a set of user expectation elements collected from a set of one or more UX tests. An expectation element, as used herein, may include a set of unstructured text that describes expectations and outcomes associated with a user's experience with a product. For example, an expectation element may include an expectation quotation that describes the user's expectations with respect to a product and an outcome quotation that describes reasons why an expectation was satisfied or not. As these data are unstructured and not confined by any schemas, the variability in UX test results may be significant. As a result, the quality of the expectation elements may vary significantly, and having an analyst sift through thousands or more such quotations is inefficient. Further, many insights may not be readily apparent to the analyst from the raw, unstructured data. Systems and methods are described herein for leveraging artificial intelligence, including machine learning (ML), to synthesize UX test results, extract the most insightful expectation elements, and deliver a set of synthesized expectation results with respect to the design of a product. Thus, system scalability may be increased, allowing for faster and greater processing capabilities of UX test result data streams while enhancing the insights gleaned from the UX test results.

In some embodiments, a system includes a delivery facet and a learning facet. The delivery facet may include a themer that predicts and assigns themes to a set of user expectation elements and a curation agent that selects representative expectation elements for the predicted themes. A theme may correspond to a label that classifies a user expectation element according to a schema. For example, a theme may correspond to a facet of a product's functional or aesthetic design, the price of the product, the available information about the product on a webpage, or other attributes associated with the product. The themer may be applied to an expectation element to estimate, based on patterns in the expectation and/or outcome quotations, a probability distribution that the expectation element is associated with various themes in the schema. The delivery system may further determine the outcome distribution of user expectations with respect to the different themes, including which user expectation themes were most likely to be satisfied, somewhat satisfied, and unsatisfied. The delivery system may present a normalized and synthesized set of results based on the distribution to focus the analyst's attention on the user expectation themes that are most relevant to a product's design.

In some embodiments, the delivery facet includes a set of generative language model based agents to enhance the quality of the AI-generated output. The agents may include a theme reviewing agent that operates on the output of the themer model, reviewing quotes assigned to particular themes and removing incorrect assignments. Stated another way, a generative language model is used to review and modify the output of a classifier model. Thus, two AI-based models (a classifier machine learning model and a generative language model) that are trained on different data and with different objects are used to contribute to the same task. The techniques allow the reviewing agent's general knowledge and basic reasoning capability to offset incorrect classifications. Misclassifications by an ML classification model may occur for multiple reasons. One reason is a theme schema is not trivial and may contain themes with conceptual overlaps, which may lead to erroneous model predictions and assignments. Another reason stems from learning from live data. Incorrectly labeled data may inadvertently be placed into a training dataset, which is difficult to completely eliminate without disproportionate effort. The generative language model may correct misclassifications and significantly improve the task results. The modified output from the generative language model may also be fed back to the themer classification model to retrain or tune the model, thereby improving the model predictions.

Additionally or alternatively, the generative language model based agents may include a curating agent that selects representative quotes for a given theme. In some embodiments, the curating agent may select different expectation elements to represent different expectation outcomes for a theme. For example, the curating may select different sets of outcome quotations to represent expectations that were satisfied, partially satisfied, or not satisfied for a given theme. The selected outcome quotations may represent the most insightful reasons why user expectations were met, somewhat met, or unmet with respect to a user experience with the product.

In some embodiments, the learning facet of the system includes a machine learning engine that trains the themer using training datasets. The themer training dataset may include example expectation elements and theme labels. The machine learning engine may train the themer to learn and extrapolate from signals that are predictive of particular themes within the user expectation data. For example, the themer may learn patterns in the keywords of expectation and/or outcome quotations that are correlated, uncorrelated, or inversely correlated with a given theme. The themer may then extrapolate from the learned patterns to estimate the likelihood that an expectation element should be assigned to each theme in a schema.

The machine learning engine may train multiple themer models for different contexts. For example, different models may be trained depending on one or more attributes of a product, such as the industry in which the product is used, the target consumer base of the product, the product type, and/or the types of features included in the product. Labeled training data may be divided and grouped along one or more such dimension to build the set of models.

By training multiple machine learning models along different dimensions, different models may learn and extrapolate from different signals that are specific to a particular domain. For example, a set of expectation elements that are predictive of a theme in one context may not be relevant to the theme in a different context. As another example, an outcome quotation may be relevant to a theme in one context but not another. Thus, given the same expectation element as input, different models may predict different theme labels and/or select different representative outcome quotations.

The system may use machine learning to adapt to changing conditions across different domains without requiring a developer to update the underlying system code. For example, the system may receive feedback on the assigned themes and/or selected quotations with respect to one or more domains. In response to the feedback, the machine learning engine may update one or more model parameters for the themer. The system may further train or retrain a model using data that is local in time such that the model "forgets" data that is older than a threshold age. Thus, the system may pick up on trending and evolving patterns as the standards and expectations for user experiences change over time.

In some embodiments, the system selects and applies one or more trained machine learning models to newly received UX test results. The system may select a model (or set of models) to apply to a given set of expectation elements based on one or more dimensions associated with the data, the UX test, the type of user experience, and/or the product for which the UX test was conducted. Each model may output a predicted label, which may correspond to a predicted theme and/or selection score for the expectation element.

The system may execute one or more operations based on the model predictions. Examples include rendering user interfaces, populating work queues with UX expectations and outcomes for further review by an analyst, generating analytics with respect to the strengths and/or weaknesses of a product's design, and/or recommending/deploying updates to a product. The techniques may reduce the turnaround time from receiving UX test results to identifying and implementing actionable insights for improving a product's design.

While various techniques relate to user expectations extracted from unstructured text, many of the techniques described herein may be applied to other types of unstructured text. For example, the theme prediction models may predict themes for unstructured text in other contexts, such as classifying a document according to a structured theme schema. The generative language models may review the classifications, make adjustments if an error is detected, and curate support for the classifications by extracting one or more quotes from the document. The results may be used to optimize search engines, aggregation services, analyst work queues, user research and design tools, among others, by automatically mapping unstructured data into a schema (e.g., a database schema) in a reliable manner with support for why the automated system made the classification. By providing structure to previously unstructured data, search processes may direct searches to the theme classifiers and supporting text rather than having to search all of the unstructured text. As a result, search processes executing on a computing device may be executed much more quickly and efficiently.

One or more embodiments described in this Specification and/or recited in the claims may not be included in this General Overview section.

2. System Architecture

FIG. 1 illustrates a system architecture for discovering and documenting user expectations in accordance with some embodiments. As illustrated in FIG. 1, system architecture 100 includes product 102, client service 110, user experience (UX) test framework 118, machine learning (ML) engine 126, themer 136, theme builder 138, large language model (LLM) agents 140, and data repository 146. In some embodiments, system architecture 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Product 102 refers to an item or service with which users may interact. Examples include articles of manufacture, software applications, cloud computing services, websites, virtual assistants, and other computing-based systems. Product 102 includes user interface 104 for interacting with one or more users. In the context of a computing system, service, or application, user interface 104 may render user interface elements and receive input via user interface elements. Example user interfaces include a graphical user interface (GUI), a command line interface (CLI), a haptic interface, and a voice command interface. Example user interface elements include checkboxes, radio buttons, dropdown lists, list boxes, buttons, toggles, text fields, date and time selectors, command lines, sliders, pages, and forms. User interfaces for other types of products may include buttons, levers, knobs, dials, and/or other physical elements through which a user may manipulate and interact with product 102.

In some embodiments, product 102 includes functional elements 106 and aesthetic elements 108, which may affect the user experience with respect to product 102. Functional elements 106 may include user interface controls through which the user may operate product 102 and/or affect the output of product 102. Functional elements 106 may further comprise backend processes and/or systems with which a user does not directly interact, but which may affect a user's experience with product 102, such as a perceived responsiveness or quality of product 102. Aesthetic elements 108 may generally comprise nonfunctional components of product 102 including the look and feel of user interface 104 and/or other visual design elements of product 102.

UX test framework 118 includes components for composing and running UX tests. The components may include UX test editor 120, UX test engine 122, and result parser 124. A UX test may comprise applications, tools, and/or processes for evaluating the performance of various facets of one or more user experiences with product 102. For example, a UX test may comprise a survey or questionnaire. Users of a website or a mobile application may be prompted to complete the UX test to evaluate their experience with product 102, which may be the website or application itself or a separate product. If the user accepts the prompt, the user may be redirected to a webpage with a set of queries to describe and/or rank various facets of the user experience with product 102.

Additionally or alternatively, a UX test may obtain performance data for one or more UX facets using mechanisms for tracking how a user interacts with product 102. For example, scripting tags that embed executable code in a website or backend processes, such as daemons, may track and collect metrics and/or other information about user interactions with product 102. Example metrics may include how long it takes a user to first interact with a user interface element, how long it takes a user to complete a function, how long a user engages with product 102, how long it takes for pages of user interface 104 to load, which products features are most frequently accessed, and which product features are least frequently accessed.

Additionally or alternatively, a UX test may obtain information about user experiences from other data sources. For example, a web scraper may crawl one or more websites for user reviews of a product to extract information about which product features are viewed most positively, which product features are viewed most negatively, what scores have been assigned for different features of the product, and what overall product score has been assigned. Additionally or alternatively, the UX test may scrape social media sites for posts tagged with a product identifier and extract information from the posts about how users interact with the product. In yet another example, a UX test may search customer databases and/or other sources to determine what percentage of users have returned a product, submitted a customer support ticket, or submitted a product complaint. A UX test may assign scores based on the extracted information using a scoring function or machine learning, where a UX test score quantifies one or more user experiences with respect to one or more facets of the user experience. Although only one product is illustrated in FIG. 1, a given UX test may be run for several different products and several different UX tests may be run for the same product.

UX test editor 120 is a tool through which users may compose and customize UX tests. For example, UX test editor 120 may include one or more GUI elements through which a user may select predefined survey questions, input new questions, define scripts for capturing performance metrics, and/or otherwise customize test applications to evaluate user experiences with product 102. UX test editor 120 may further allow users to define parameters associated with running a UX test, such as what segment to target, what platform to use running the test, and/or other parameters controlling how the UX test is run.

UX test engine 122 runs tests defined through UX test editor 120. A UX test may include a query mechanism to prompt or search for data describing or quantifying one or more facets of a user experience. For example, UX test engine 122 may prompt a sample set of visitors to a webpage to complete a survey describing and/or ranking various facets of a user experience with product 102. As another example, UX test engine 122 may capture webpage usage metrics from the set of visitors using scripting tags and/or scrape review sites for information describing product 102, as previously described. The tests may be run in accordance with the parameters input through UX test editor 120. The results of a UX test may include qualitative elements describing the user experience and/or quantitative elements that quantify the user experience.

In some embodiments, UX tests allows users to input unstructured and/or structured qualitative data describing the user's experience with product 102. For instance, a UX test may capture an "expectation quote" that describes the user's expectations without being confined to a schema, an "outcome quote" that describes the outcome for an associated expectation (also without being confined to a schema), and an outcome selected from a predefined schema (e.g., "fully met", "somewhat met", "unmet", etc.). The triplet of the unstructured expectation quote, unstructured outcome quote, and selected outcome may be part of an expectation element collected by UX test framework 118. A UX test may collect one or more expectation elements from one or more users. In other embodiments, an expectation element may include additional information associated with a user's expectations with product 102 and/or may omit one or more items from the triplet.

Result parser 124 parses the results of UX tests to extract expectation elements from the result set. For example, result parser 124 may extract the expectation quotes, outcome quotes, and associated outcomes. Result parser 124 may further extract additional information about individual expectation elements and/or groups of expectation elements, including attributes about the author of a quotation and what quantitative score the respondent gave to a facet of the user experience that is relevant to the expectation quotation.

ML engine 126 uses machine learning to build models based on sample UX test data. ML engine 126 may include training service 128 for building the set of ML models, model selector 130 for selecting ML models to apply based on context, prediction service 132 for applying ML models to results extracted by result parser 124, and tuning service 134 to make runtime adjustments to ML models based on feedback.

In some embodiments, ML engine 126 trains, tunes, and applies themer 136. Themer 136 represents an ML classification model that user machine learning rather than a static set of rules to assign user experience data to themes based on model predictions. Themer 136 may be trained to predict themes for test expectation elements using one or more machine learning algorithms. Machine learning algorithms allow computer programs to learn and make predictions or decisions without being explicitly programmed for every specific task.

In some embodiments, applying an ML model (e.g., themer 136) includes generating an ML vector for the expectation element based on the unstructured text. The ML vector may be generated using a word embedding model, such as Word2Vec, or through other encoding schemes. A process applying themer 136 may then perform a forward pass of the ML vector through the neural network model.

In other embodiments, other ML models may be applied to generate the prediction, including other types of neural language models. Such models may be trained using machine learning algorithms that can be iterated to learn a target model f, where the model maps a set of input variables to an output variable using a set of training data. Various types of algorithms may be used, such as linear regression, logistic regression, linear discriminant analysis, classification and regression trees, naïve Bayes, k-nearest neighbors, learning vector quantization, support vector machines, bagging and random forest walkthroughs, boosting, backpropagation, and/or clustering. The model output may include an estimated label representing a prediction on the theme for an element that contains unstructured text, such as an expectation element.

Theme builder 138 may be used to add, delete, and/or edit themes within a theme schema. When a theme schema is modified, ML engine 126 may update themer 136, such as by retraining and/or tuning the model. Once themer 136 has been updated, it may be used to update previous theme predictions and/or generate new predictions to classify/reclassify expectation elements based on the modified schema.

Large language model (LLM) agents 140 use generative language models to perform one or more tasks, as further described herein. A generative language model is a type of AI model designed to generate human-like text or language. The models are trained on large datasets of text and to produce coherent and contextually relevant text that can mimic human writing. The models may thus be trained to learn general knowledge from the large datasets that are not tied to the theme schema whereas themer 136 may be trained to learn domain-specific knowledge using tailored examples of how the theme schema has been used to classify unstructured text. As previously noted, the generalized knowledge of the LLM may be used to correct misclassifications of themer 136, which may improve the quality of the system outputs.

LLM model agents 140 may be implemented using an external generative language model service, such as ChatGPT or Bard AI, or be a local service. The architecture of LLM model agents 140 may vary depending on the particular implementation. Example architectures include may include:

a. Recurrent neural networks (RNNs): RNNs are a class of neural networks designed to handle sequential data, making them suitable for processing sequences of words in a sentence. RNNs maintain an internal state (hidden state) that is updated with each new input word. The hidden state carries information from previous words and influences the predictions for the next word. This process is referred to as "unrolling" the RNN through time. During training, the RNN is fed sequences of words, and it learns to predict the next word in a sequence given the context of the previous words. One technique, referred to as "teacher forcing," occurs where the true next word is provided during training to help guide the learning process. The model is optimized to minimize the difference between its predictions and the actual next words in the training data. Long Short-Term Memory (LSTM) and Gated Recurrent Unit (GRU) RNNs may be used to capture long-range dependencies in text.

b. Transformers-based models: Unlike RNNs, transformers process the entire sequence of words simultaneously, allowing these models to better capture long-range dependencies in the text. In the transformer model, the input text is split into word embeddings, which represent each word as a high-dimensional vector. These embeddings are then passed through multiple layers of self-attention and feedforward neural networks. The self-attention mechanism allows the model to weigh the importance of each word in the context of the entire sequence, enabling it to focus on relevant words for generating the next word. During training, the model is exposed to vast amounts of text data and learns to predict the likelihood of each word occurring given its context. This process involves adjusting the model's parameters (weights) to minimize the difference between its predictions and the actual words in the training data. The transformer model can be fine-tuned on specific tasks or used as a pre-trained language model for various downstream tasks.

In some embodiments, LLM agents 140 include reviewing agents 142 and curating agents 144. Reviewing agents 142 review the output of themer 138 and may modify the predicted themes if a misclassification is predicted. Once a final set of themes has been identified for a given set of unstructured text, curating agents 144 may select supporting facts from the text. For example, curating agents 144 may select one or more expectation quote that support a given user expectation theme discovered within a set of user experience test results.

Data repository 146 stores and fetches data including test expectation elements 144, test contexts 148, and trained models 150. In some embodiments, data repository 146 is any type of storage unit and/or device (e.g., a file system, database, collection of tables, or any other storage mechanism) for storing data. Further, data repository 146 may include multiple different storage units and/or devices. The multiple different storage units and/or devices may or may not be of the same type or located at the same physical site. Further, data repository 146 may be implemented or executed on the same computing system as one or more other components of system architecture 100. Alternatively or additionally, data repository 146 may be implemented or executed on a computing system separate from one or more other system components. Data repository 146 may be communicatively coupled to remote components via a direct connection or via a network.

Client service 110 may comprise applications, tools and systems used by product designers and/or third-party service providers that run specialized UX tests. In some embodiments, client service 110 comprises frontend interface 112, recommendation engine 114, and product interface 116. Frontend interface 112 may comprise a user interface for presenting analytics, recommended actions, and/or other information based on the predictions. For example, frontend interface 112 may generate and render interactive charts that allow a user to compare predicted UX test scores for product 102 to performance benchmarks and view the most relevant test themes and representative expectation elements. The user may view which facets are underperforming relative to peer products, the most informative expectations and outcomes describing why the expectations were not satisfied, and recommended actions to address the problems.

Recommendation engine 114 may comprise logic for generating recommendations. For example, recommendation engine 114 may determine which facets are underperforming and which solutions are predicted to improve performance with respect to the facet.

Recommendation engine 114 may leverage analytics and/or machine learning to generate the recommendations. For instance, recommendation engine 114 may learn patterns within the expectation elements and UX benchmarks for various products. Recommendation engine 114 may apply a trained model to a set of representative expectation elements and/or themes for product 102 to recommend product updates that are predicted to improve the product's benchmark scores.

Product interface 116 may be communicatively coupled to product 102 and allow client service 110 to invoke and/or execute functions on product 102. For example, product interface 116 may include an application programming interface (API) endpoint to send requests to a software application or a service to execute a requested change in the user interface. As another example, product interface 116 may invoke an editor to change a webpage associated with product 102. The requests and functions that are invoked may be directed to improving underperforming facets of product 102.

The components illustrated in FIG. 1 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

One or more components illustrated in FIG. 1, may be implemented as a cloud service or a microservice application. Tenants may subscribe to a cloud service to track UX benchmark scores of a product, view the most helpful qualitative data highlighting the product design features that excelled or underperformed, and implement recommended actions to improve the product design. Additional embodiments and examples relating to computer networks are described below in Section 7, titled Computer Networks and Cloud Networks. Additional embodiments and examples relating to computer networks are described below in Section 8, titled Microservice Applications.

3. Artificial Intelligence Guided Discovery and Delivery of User Expectations

When UX test results are received, the results may include expectation elements that describe new user expectations and outcomes. The expectation elements may be unique and not previously encountered by a system. For example, the UX test results may include expectation and outcome quotations that were not included in any previous UX tests or training examples. As these data are unstructured and not confined by any schemas, the variability in UX test results may be significant. As a result, the quality of the expectation elements may vary significantly. Having an analyst sift through thousands or more such results is inefficient. Further, many insights may not be readily apparent to the analyst from the raw unstructured data. The system may leverage artificial intelligence, including machine learning, to synthesize UX test results, extract the most insightful expectation elements, and deliver a set of synthesized expectation results with respect to the design of product 102.

As previously noted, many of the examples provided herein relate directly to processing unstructured data within UX test results. However, some embodiments described herein may be applied in other contexts, such as classifying other types of test results or documents that contain unstructured text. The theme schemas may be mapped to database schemas and/or other data structures to organize data and optimize database operations (e.g., data searching, retrieval, updates, etc.) on the data. The curated examples that are selected also allow other systems and users to review why classifications were made and provide context for the classification.

Figure 2:
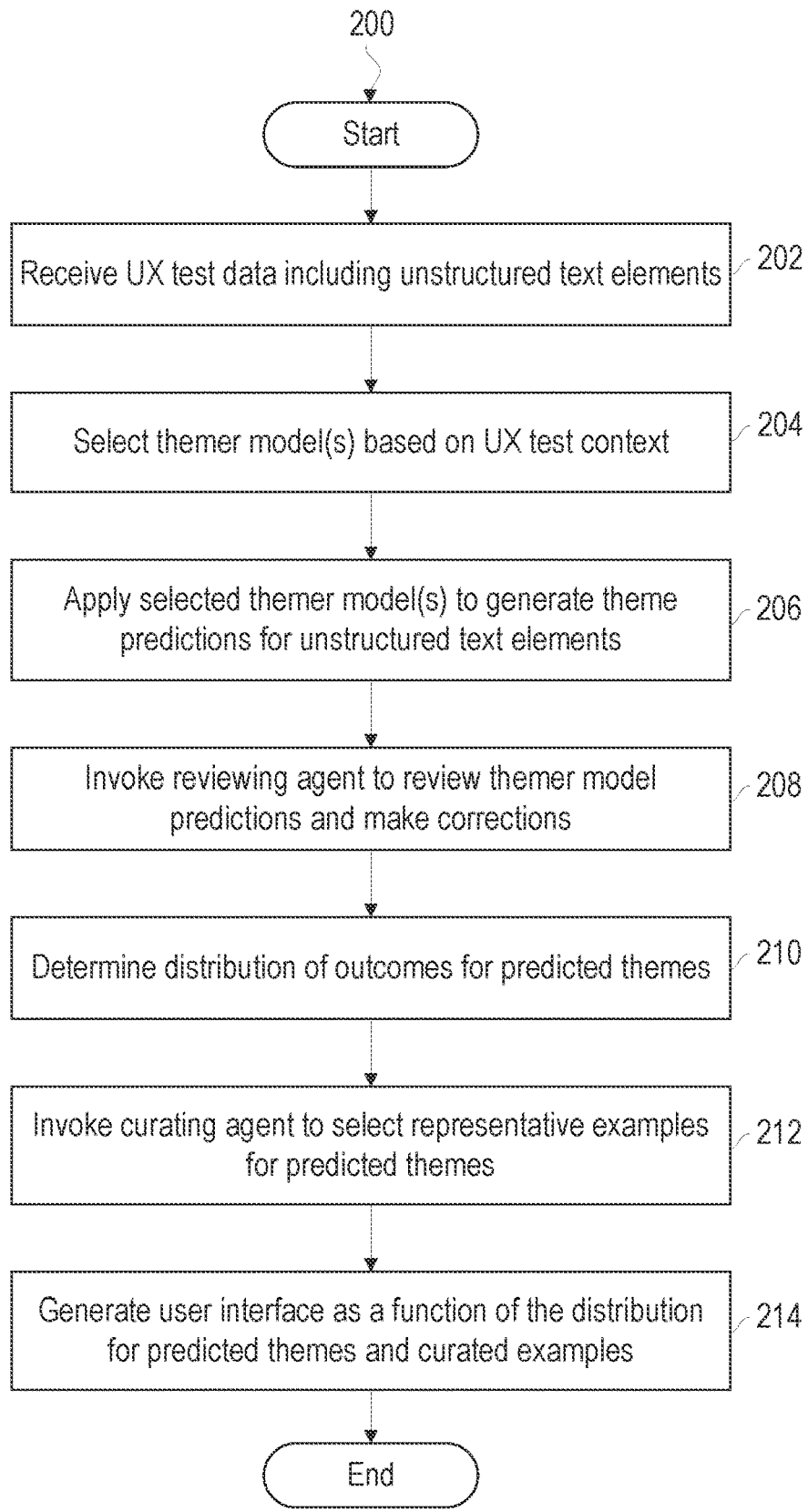
FIG. 2 illustrates a process that uses machine learning to predict themes and select representative quotations for a set of user expectations in accordance with some embodiments.

FIG. 2 illustrates process 200 that uses machine learning to predict themes and select representative quotations for a set of user expectations in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

At operation 202, process 200 receives UX test data including unstructured text, such as expectation elements. In some embodiments, an individual UX test allows a user to specify one or more expectations with respect to product 102. As previously noted, each expectation element may include an unstructured expectation quotation, an unstructured outcome quotation, and an outcome selected from a predefined outcome schema. For example, the user may describe expectations that the user had before interacting with product 102 regarding product features, price, usability, value, and/or other facets. The unstructured data may comprise text that does not conform to any schema. Without restricting the input to a predefined schema, the choice of words, grammatical structure, word sequence, and quotation length may be highly variable and difficult to predict.

At operation 204, process 200 selects one or more themer models based on a UX test context. In some embodiments, process 200 may determine the context based on one or more UX test attributes (e.g., what types of questions are included in the UX test, what is the target audience of the UX test, etc.), the product being tested (e.g., what features are included in the product, how the product is classified/ categorized, etc.), the industry associated with the product, and/or the respondent that submitted the question (e.g., age, income, education, gender, etc.). UX test framework 118 may track these attributes during runtime as tests are conducted. Process 200 may then select an ML model that is mapped to the dimensional attributes defining the context. For example, process 200 may select a business-to-business (B2B) model if the product or UX test is directed to sophisticated enterprise customers and a business-to-consumer (B2C) model if directed to retail consumers. As another example, process 200 may select the model based on the product type, industry, survey questions included in the UX test, and/or other dimensional attributes defining the context.

In some cases, process 200 may select multiple themer models if multiple contexts apply. Selecting multiple models may allow an analyst to view different predicted themes and insights across different domains and dimensions. Theme schemas may vary between different domains. For example, the set of available themes defined for an industry-based themer may be different than the set of available themes for a themer tied to a specific product type. Thus, different themers may map the same expectation element for different themes depending on the context for which the themer model is generating predictions.

Additionally or alternatively, a hierarchy of themer models and/or theme schemas may be defined. For example, an industry-based model may be tied to multiple product type models for different types of products competing in the same industry. The industry-based model may predict themes for a parent schema that is applicable across all product types. The industry-based schema may be augmented by the product type schemas that are relevant to only a subset of one or more product types. The industry-based themer may be selected to generate predictions for industry themes, and the product-type themer may be selected to generate predictions specific to the specific class of product. The selection and mix of themers may vary depending on the particular implementation.

At operation 206, process 200 applies the selected themer model(s) to generate theme predictions for the unstructured text elements. In some embodiments, process 200 applies the model by generating a text document for each expectation element collected from the UX test and passing the text document to one or more context-specific ML models trained to predict themes based on learned patterns. The text document may include a normalized set of expectation data, which may include the expectation quotation, the outcome quotation, and the outcome.

In some embodiments, a context-specific themer outputs a predicted theme for each expectation element document passed into the model. The underlying ML model may compute a conditional probability distribution that includes probabilities that the expectation element should be assigned to each theme in a context-specific schema. The themer may then output the theme with the highest probability.

As previously noted, in some embodiments, multiple themers may be applied to the same expectation element. When multiple models are applied to the same expectation element, each themer may output a predicted theme. The predictions for a given element may vary based on the theme schemas and the context-specific patterns learned from the training datasets. Theme schemas may vary between different context or be the same, depending on the particular implementation.

In some embodiments, the predicted themes may be presented via a user interface to an analyst for review before proceeding with the additional steps in the process. The interface may include elements that allow the user to reassign themes if the prediction is deemed incorrect and assign themes to elements if the ML model did not have a sufficient signal to generate a prediction. In the latter case, the label for the associated expectation element may be unclassified. The feedback may be provided to update the ML models as described in further detail below. In other embodiments, the process may proceed without any review of the predicted themes.

At operation 208, process 200 invokes a reviewing agent to review the themer model predictions and make corrections if the reviewing agent predicts that a misclassification was made. In some embodiments, a prompt management engine generates prompts to invoke the reviewing agent as a function of the output of the themer model and a set of message fragments. The prompt management engine may conduct a dialogue with the LLM agent, where the dialogue includes a request to review the theme classifications for a set of expectation elements (or other unstructured textual elements). A specific example of set of input prompts to the LLM model agent is provided in the section below. However, the exact form of the prompt may vary from implementation to implementation.

At operation 210, process 200 determines a distribution of outcomes for the predicted themes. In some embodiments, process 200 computes the distribution by aggregating the selected outcomes for each assigned theme. For example, process 200 may compute what percentage of user expectations mapped to a given theme were met, somewhat met, and unmet. Additionally or alternatively, process 200 may determine the counts and percentages of the expectation elements assigned to each theme.

In some embodiments, process 200 may assign relevance scores to themes based on count values and/or other factors. For example, process 200 may assign a relevance score such that themes with higher count values have a higher score and are determined to be more relevant for providing insights into the product designs. As another example, process 200 may assign weights to the scores based on the outcome distribution for the elements and/or a quality score assigned to the outcome quotations. Themes with a higher negative outcome distribution and/or higher quality outcome quotations may be more helpful for guiding product design decisions.

At this stage, process 200 has normalized and synthesized the incoming data to an extent that theme histograms and in situ outcome distributions may be rendered. Process 200 (or a separate process) may render these items before or in parallel with execution of the subsequent operations. The following operations relate to selecting example quotations authored by product users to understand the reasons for the outcomes.

At operation 212, process 200 invokes a curating agent to select representative examples for the predicted themes. In some embodiments, a prompt management engine generates prompts to invoke the curating agent as a function of the predicted themes (after review by the reviewing agent) and a set of message fragments. The prompt management engine may conduct a dialogue with the LLM agent to perform the selection. For example, the prompt management engine may request that the LLM select up to n outcome quotes for a given theme that are most helpful to understand the "why" for a given outcome. A specific example of set of input prompts to the LLM model agent is provided in the section below. However, the exact form of the prompt may vary from implementation to implementation.

In some cases, the curating agent may perform the selection based on a particular context. For example, the input prompts may specify an industry and/or product to provide context to the curating agent for the selection. The curating agent may use the context to select outcome quotations based on industry-specific and/or product-specific patterns learned from the large corpus of text from which it was trained.

At operation 214, process 200 generates and renders a user interface as a function of the distribution for the predicted themes and the curated exmaples. In some embodiments, the user interface includes only the top themes and top n elements for each theme outcome. The other themes and quotations may be hidden, inaccessible, or otherwise not included in the user interface that is rendered. Additionally or alternatively, the user interface may include interactive charts, such as interactive histograms and bar charts, that allow a user to view the distribution of themes and outcomes. The interactive interface and charts may further allow the user to drill-down and perform further analysis as to the reasons why user expectations were satisfied, partially satisfied, or unsatisfied. The rendered user interface may optimize an analyst's workflow by focusing their attention on the expectation themes and outcomes that are most likely to provide insights into what is working and what is problematic with a product's design.

Figure 3:
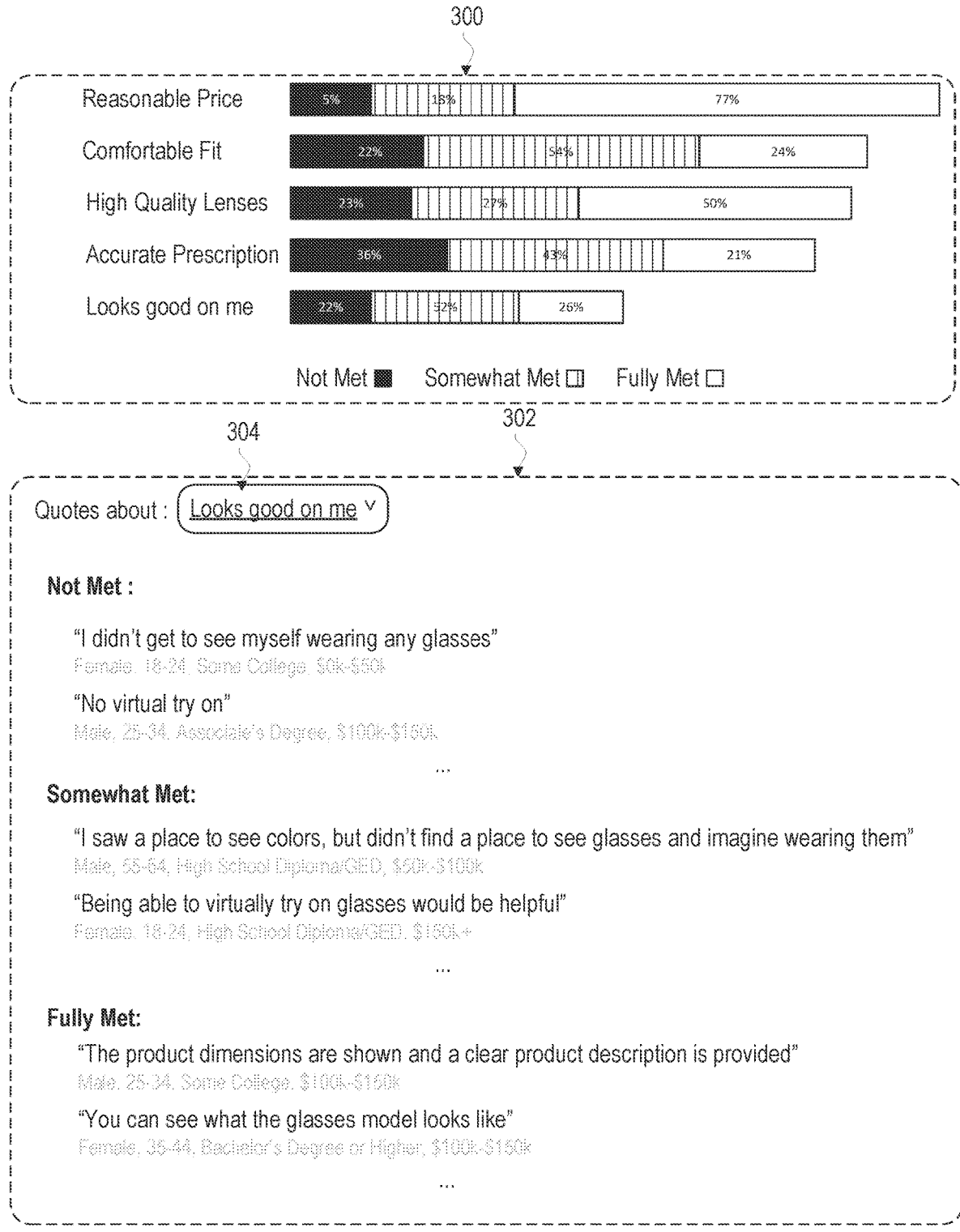
FIG. 3 illustrates a user interface for viewing and analyzing user expectation themes and insights in accordance with some embodiments.

FIG. 3 illustrates a user interface for viewing and analyzing user expectation themes and insights in accordance with some embodiments. The user interface includes histogram 300, with each histogram bin representing a different theme. In the present example, histogram 300 includes the top five themes predicted by a context-specific themer for a bifocal product. The themes include expectations with respect to the price, fit, lens quality, prescription accuracy, and aesthetics of the product. The length of each bin represents the number of expectation elements assigned to each theme. The bins are sorted by length, with the longest bin having the greatest number of expectation elements assigned. Each bin further depicts the distribution of expectation outcomes for the expectation elements assigned by the themer. The outcomes indicate whether the user's expectation for the theme were not met, somewhat met or fully met.

The user interface further includes display area 302, which presents representative outcome quotations for a selected theme outcome. The user may select different themes using interface control 304 or by selecting a bin from histogram 308, such as by clicking on the bin icon or associated label. In the present example, the top two outcome quotes are shown for the selected theme for three separate outcomes. However, the number of representative quotes that are presented may vary depending on the particular implementation. In some embodiments, the user may drill down further into a particular theme outcome to view additional representative quotations. Each outcome quotation further includes additional data about the author of the quotation.

The themes and expectation elements that are presented may be used to guide product design optimizations. Analysts and product designers may quickly determine which themes are most relevant to user expectations and what the outcome is for those expectations. The representative outcomes may provide insights into the reasons why the outcomes occurred. For instance, in the example presented in FIG. 3, the model outputs may be processed to quickly determine that users would benefit from a virtualization feature through which users may virtually try on the product.

4. Theme Reviewing and Curating Agents

Figure 4:
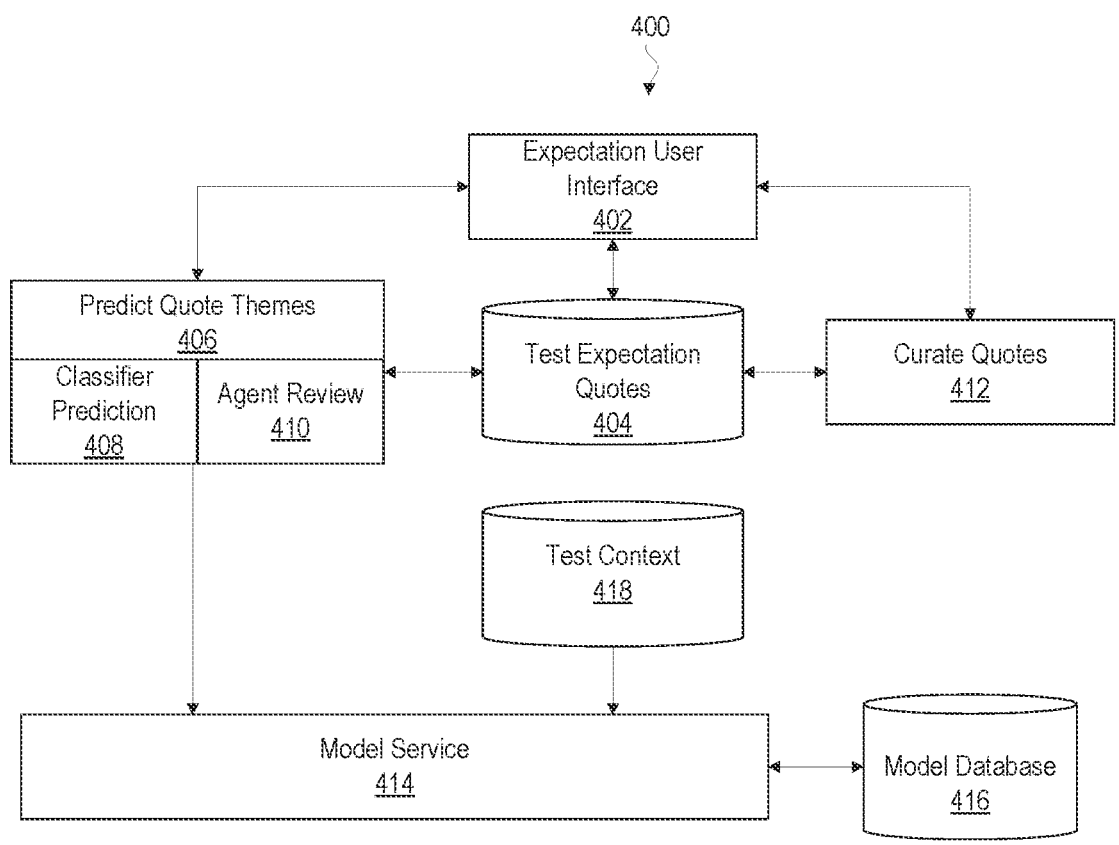
FIG. 4 illustrates a process for building and training neural language models in accordance with some embodiments.

FIG. 4 illustrates execution flow diagram 400 for performing agent-based discovery and documentation of user expectations in accordance with some embodiments. Each component illustrated in FIG. 4 may be distributed over multiple applications and/or machines. In some embodiments, multiple components may be combined into one application and/or machine. Additionally or alternatively, operations described with respect to one component may instead be performed by another component. One or more operations illustrated in FIG. 4 may be modified, rearranged, or omitted all together. Accordingly, the particular sequence of operations illustrated in FIG. 4 should not be construed as limiting the scope of one or more embodiments.

Referring to FIG. 4, test expectation quotes 404 are collected from a UX test during or after test runtime. The quotes may be reviewed and edited using expectation user interface 402. The execution flow is described with reference to a potential path of an analyst. However, the exact path may vary depending on the implementation. Further, the execution flow may be applicable to performing theme discovery and documentation in other contexts, as previously mentioned.

In some embodiments, the analyst's workflow begins with a request to initiate quote theming. For example, the request may be triggered through the analyst's selection of a button or some other GUI element within expectation user interface 402. In response, the process uses data about the product being tested to fetch a theme classifier trained to predict its expectation themes. In the illustrated example, model service 414 fetches the trained model from model database 416 based on test context 418.

The fetched theme classifier is used to predict quote themes at block 406 via classifier prediction operation 408. In some embodiments, each quote is presented to the classifier which predicts and assigns a theme. In some cases, a quote may remain unclassified, such as if the classifier's confidence in a prediction is less than a threshold. For example, a heuristic score may be used such that the theme is assigned if and only if the predicted score is at least 0.8. However, the threshold for making the assignment may vary depending on the particular implementation or be omitted.

In some embodiments, a process next partitions the quotes that have received assignments into batches. A generative model based reviewing agent is used to unassign quotes that are not relevant to the assigned theme at agent review operation 410. The removed quotes may be used as feedback to retrain and/or fine tune the model to improve future predictions. Example reviewing agent configurations, input prompts, and management operations are discussed in further detail below.

In some embodiments, the analyst uses expectation user interface 402 to review and edit the theme assignments. Once satisfied with the results, the analyst may submit a second request, by selecting another button or GUI element, to initiate curation. In other cases, curation may trigger without requiring any analyst review of the themes. Any changes made by the analyst may be used to retrain and/or fine tune the theme prediction model and improve future predictions.

In some embodiments, the curation process starts by partitioning the quotes into collections of distinct theme and outcome combinations. For example, if there is a theme of "Reasonable Prices", then the process may partition quotes into a "met" collection, "somewhat" collection, and "unmet" collection. Curate quotes operation 412 presents the quotes to a curation agent that marks quotes as visible if the quote is clearly relevant to the theme and explains the outcome. For each theme, the visible outcome distribution is compared to the actual distribution. If there is a significant difference, an iterative process may be used to adjust the select quotes as discussed further below.

The modifications made to the expectation quotes are persisted and presented to the analyst through expectation user interface 402. The analyst may then use the interface to review and finalize the results.

A process may issue a call that invokes a reviewing agent to review the predicted theme assignments output by a classifier model (e.g., themer 136). In some embodiments, the reviewing agent is configured and managed as follows:
Reviewing agent
Task
Select quotes that are not relevant to a particular theme.
Behavior Configuration
Message content fragment that includes agent's primary function and instructions to constrain the responses to match the original quotes.
Initial Context
Test details (industry and product) and theme.
Management Algorithm
Collect incoming quotes, partition into batches with a maximum threshold (e.g., up to 25 quotes), send and forget a message to a generative language model for each partition to select irrelevant quotes, and return the total collection of irrelevant quotes to the caller.
The partitioning into batches helps enhance accuracy. Testing has demonstrated that current generative language models become unreliable past a threshold number of quotes (currently about 25, though the threshold may change with advancements in generative language model architectures).
The caller takes the selected irrelevant quotes and removes the theme assignments.

A process may issue a call that invokes a curating agent to select examples that support a given theme and outcome. In some embodiments, the curating agent is configured and managed as follows:
Curating agent
Task
Select quotes predicted to help a user understand the "why" of a particular expectation outcome.
Behavior Configuration
Message content fragment that includes agent's primary function and instructions to constrain the responses to match the original quotes.
Initial Context
Test details (industry and product), theme, and outcome.
Management Algorithm
Collect incoming quotes, send and forget a message to a generative language model for each partition to select quotes, and return the selected quotes to the caller.
The caller marks the returned quotes as visible via the user interface.

A detailed example of the reviewing and curating agent operations is described below for purposes of clarity. Components and/or operations described below should be understood as one specific example which may not be applicable to certain embodiments. Accordingly, components and/or operations described below should not be construed as limiting the scope of any of the claims.

Table 1 illustrates a set of expectation quotes collected for a donation product in the nonprofit industry. The quotes were assigned to the "Transaction is secure/not a scam" theme. The format for the quotes is {expectation quote}; {outcome quote} where the {expectation quote} is collected before the respondent is exposed to the experience and the {outcome quotes} is collected after.

TABLE 1

| Example Expectation Quotes |
| --- |
| - Bleak future; The history of the program itself and the future it envisioned is not clearly addressed. |
| - Helps people in need; Doesn't really address the issue as you can't stop scamming people unless it's security that they can't access |

TABLE 1-continued

| Example Expectation Quotes |
| --- |

- that the charity recharges my card or account; It says I would set that up, but online companies do rebill without warning.
Surfshark is an example of an unscrupulous entity that rebills without asking.
- Scam; There is no proof that this is legit. Could have included reports with the amount raised
and where it has been spent
on
- online safety; This online donation is secure
- scam; The page seemed credible to me.
- The money will actually go to the intended; It states BRAND is just the donater
- it is a scam; The URL was quite concerning to look at and there wasn't much confirmation
that it was a real BRAND site.
- Security; The system seemed secure
- that the operators gets my money; What other way can someone be sure that it is secure
- that it is legit; It is using a secure site
- It is a scam; Oz Harvest and World Vision both mentioned but they are two different organisations.
- fraud; Need to check the source/origin of website
- Dishonesty and political leanings of the charity; I don't expect BRAND to look into these things.
- Support healthy drinking water; World Vision work on helping underprivileged children in areas where drinking water is\not
safe and clean,
- Family security; Nothing to do with it
- its a scam; I trust BRAND to not steal my details
- Scam; There was the disclaimer at the bottom but it didn't seem trustworthy enough
- Job; I can't find a job using this page or widget
- That they're a scam; They're was nothing to show they were who they said they were
- that it is a scam; It was bland
- is it real; It looks like scam
- scam; Seemed legitimate
- People in need dont get the help; Online is never 200% reliable in any way as people are getting scam emails, texts
pretending to be loved ones debt collectors, government, the list goes on who can people trust
- not a scam; It looks like scam
- Security; Its somewhat a secure process
- that it is secure; that it was BRAND gave it credibility and the https was at the heading
- scam/fraud; Too vague and generic in claims of help. Mention specific countries and regions
within those countries to show
me I have met someone from that region to persuade me to donate.
- scammers; It didn't come up
- reliable organisation; This online donation is conducted by a reliable organisation
- my donation won't be received by the right organisation; Was concerned as the donation was
taken by a third party (BRAND)
which was kind of listed in the terms and conditions but most would skip and not read that section
- It is a scam; It might be a scam and my money may not be donated.
- It's a scam; Luck of the draw
- Fund is a fraud; It's a verified page
- it is a scam; See reasoning number one.
- Being scammed; The BRAND logo helps to know it's trustworthy
- that I get scammed; Ditto above, how else can someone be sure
- Money doesn't make it to actual charity; They have their terms mentioned, nothing there outlining the fee BRAND collect.
- Scams; The site seems somewhat sketchy and untrustworthy overall.
- I avoid online because I don't want to be rebilled periodically; It confirmed that I am right to
keep away from online
charity sites
- reliable; Looked legitimate
- Scam; I don't think it is a scam - but the lack of connection made between OzHarvest and World Vision is somewhat
concerning. The misleading or incomplete information could be purposeful for the purpose of
a scam.
- Honesty; Was a clear & credible system.
- ripoff; The BRAND payment
- fund will go to those in need; The page seemed credible to me.
- my credit card is not compromised; What proof is given, rather than recognised names and
companies?
- The security of the website; Looks safe besides the url
- It is a fraud; It involves a recognisable charity TABLE 1-continued Example Expectation Quotes

- the ceo earns less than i do; The ceo of each charity BRAND donate supports should be named and have their yearly wage
listed right at the top alongside the name of the charity your donating to.. I saw nothing.
- the charity being a scam; The security mark in the weblink helps somewhat The execution flow described above may partition the 50 quotes illustrated above into two batches of 25, and each batch may be used to have a preconceived dialogue with a generative language model to select irrelevant quotes. An example dialogue is presented in Table 2 below, including the input prompts the reviewing agent and the agent's response/output. In the example illustrated, the content in bold is the content that represents the agent's constraints and context, and the quotes are the transitory elements that are used to perform a review operation and then discarded.

TABLE 2

Example Reviewer Agent Dialogue

-- system --
You are a helpful user experience researcher.
-- user --
Expectation Quotes
- Bleak future; The history of the program itself and the future it envisioned is not clearly addressed.
- Helps people in need; Doesn't really address the issue as you can't stop scamming people unless it's security that they
can't access
- that the charity recharges my card or account; It says I would set that up, but online companies do rebill without warning.
Surfshark is an example of an unscrupulous entity that rebills without asking.
- Scam; There is no proof that this is legit. Could have included reports with the amount raised
and where it has been spent
on
- online safety; This online donation is secure
- scam; The page seemed credible to me.
- The money will actually go to the intended; It states BRAND is just the donater
- it is a scam; The URL was quite concerning to look at and there wasn't much confirmation
that it was a real BRAND site.
- Security; The system seemed secure
- that the operators gets my money; What other way can someone be sure that it is secure
- that it is legit; It is using a secure site
- It is a scam; Oz Harvest and World Vision both mentioned but they are two different organisations.
- fraud; Need to check the source/origin of website
- Dishonesty and political leanings of the charity; I don't expect BRAND to look into these things.
- Support healthy drinking water; World Vision work on helping underprivileged children in areas where drinking water is\not
safe and clean,
- Family security; Nothing to do with it
- its a scam; I trust BRAND to not steal my details
- Scam; There was the disclaimer at the bottom but it didn't seem trustworthy enough
- Job; I can't find a job using this page or widget
- That they're a scam; They're was nothing to show they were who they said they were
- that it is a scam; It was bland
- is it real; It looks like scam
- scam; Seemed legitimate
- People in need dont get the help; Online is never 200% reliable in any way as people are getting scam emails, texts
pretending to be loved ones debt collectors, government, the list goes on who can people trust
- not a scam; It looks like scam

Which of the Expectation Quotes are not relevant to the theme of 'Transaction is secure/not a scam' for the 'Nonprofit' industry
and 'Donations' product?
Respond with a bulleted list of irrelevant quotes as they originally appeared.
-- assistant --
- Bleak future; The history of the program itself and the future it envisioned is not clearly addressed.
- Helps people in need; Doesn't really address the issue as you can't stop scamming people unless it's security that they
can't access

TABLE 2-continued

Example Reviewer Agent Dialogue

- Support healthy drinking water; World Vision work on helping underprivileged children in areas where drinking water is\not
safe and clean,
- Family security; Nothing to do with it
- Job; I can't find a job using this page or widget The quotes that are selected as irrelevant may be seen to be mostly misclassifications, which should have the assignment changed. In some embodiments, these quotes remain unclassified once removed. However, other embodiments may reassign the quotes.

A curator may next be invoke to select supporting quotes for a given theme and outcome. As noted above, the management algorithm for the curator agent applies a context and a send-forget message. Table 3 illustrates an example dialogue with a curator agent including the input prompts and the agent's response/output.

TABLE 3

Example Curating Agent Dialogue

-- system --
You are a helpful user experience researcher.
-- user --
Quotes
- There is no proof that this is legit. Could have included reports with the amount raised and
where it has been spent on
- This online donation is secure
- The page seemed credible to me.
- The system seemed secure
- It is using a secure site
- Oz Harvest and World Vision both mentioned but they are two different organisations.
- I trust BRAND to not steal my details
- There was the disclaimer at the bottom but it didn't seem trustworthy enough
- Online is never 200% reliable in any way as people are getting scam emails, texts pretending
to be loved ones debt
collectors, government, the list goes on who can people trust
- Its somewhat a secure process
- that it was Mastercrd gave it credibility and the https was at the heading
- Too vague and generic in claims of help. Mention specific countries and regions within those
countries to show me I have
met someone from that region to persuade me to donate.
- This online donation is conducted by a reliable organisation
- Was concerned as the donation was taken by a third party (BRAND) which was kind of listed in the terms and conditions but
most would skip and not read that section
- It might be a scam and my money may not be donated.
- The BRAND logo helps to know it's trustworthy
- They have their terms mentioned, nothing there outlining the fee BRAND collect.
- It confirmed that I am right to keep away from online charity sites
- I don't think it is a scam - but the lack of connection made between OzHarvest and World Vision is somewhat concerning. The
misleading or incomplete information could be purposeful for the purpose of a scam.
- The BRAND payment
- The page seemed credible to me.
- Looks safe besides the url
- It involves a recognisable charity
- The security mark in the weblink helps somewhat

Which of the Quotes clearly describe why the experience somewhat met the expectation of 'Transaction is secure/not a scam' for
the 'Nonprofit' industry and 'Donations' product?
Respond with a bulleted list of selected quotes as they originally appeared.
-- assistant --
- This online donation is secure
- The page seemed credible to me.
- The system seemed secure
- It is using a secure site
- I trust BRAND to not steal my details
- Its somewhat a secure process
- that it was Mastercrd gave it credibility and the https was at the heading
- This online donation is conducted by a reliable organisation
- The BRAND logo helps to know it's trustworthy
- The security mark in the weblink helps somewhat In some embodiments, the AI process may perform a curation distribution adjustment to make the distribution of visible/selected quotes comparable to the complete distribution. For example, a complete distribution of outcomes may be as follows where the sub-bullets are used to track the indices of the quotes as they might appear in an array:

Met: 4
   0, 2, 3, 6
Somewhat: 4
   4. 7. 8. 9
Unmet: 2
   1, 5

After curation, the distribution of visible quotes may be as follows:

Met: 3
   0, 2, 3
Somewhat: 4
   4. 7. 8. 9
Unmet: 1
   5

In the above example, ordering of the outcomes from largest to smallest with a prescribed bias for matches met-somewhat-unmet is different from the visible somewhat-met-unmet. To address the issue, a quote may be randomly selected and hid from a deviating outcome. As an example, the process may pick the outcome with the largest overrepresentation in the visual distribution relative to the actual distribution and hide a quote. In the example above, the outcome selected would be "somewhat" and a quote may be randomly hid (e.g., the quote with the index 8) The result would be a visual distribution with the same relative magnitudes as follows:

Met: 3
   0, 2, 3
Somewhat: 3
   4. 7. 9
Unmet: 1
   5

In other embodiments, the selection may be made non-randomly, such as using a selection score or based on the order in the array.

5. Learning and Model Maintenance

In some embodiments, themer 136 includes one or more ML models that are trained to learn and extrapolate from patterns within training datasets. With respect to themer 136, training service 128 may pick up on signals that are positively or negatively correlated with assigning expectation elements to a theme. The patterns may be based on the tokens (e.g., unigrams and n-grams) within expectation and/or outcome quotations, the position of the tokens relative to other tokens in the quotations, the presence/absence of frequently co-occurring tokens, the grammatical attributes associated with the tokens (e.g., what part-of-speech a token is, whether the token is a subject or object, whether the token is part of a phrase or clause, etc.), and the state at any preceding point in the sequence of tokens. Neural language models, such as transformer machine learning models and recurrent neural networks, may be trained to learn and extrapolate from such patterns present in a training dataset. Examples herein relate to training and applying bi-directional encoder representation for transformer (BERT) models. However, other types of machine learning models may also be trained and applied, depending on the particular implementation.

As previously noted, different machine learning models may be trained for different contexts. A particular context may be defined by one or more attributes or dimensions. Example dimensions may include the industry in which products are used, the product type, the features included in a product, the target application of the product, the target consumer base of a product, the target segment of a UX test, the facets of a user experience being tested, and attributes of the questions included in a UX test. For instance, B2B models may be trained for products that are targeting enterprises, and B2C models may be trained for products that are targeting individual consumers. As another example, different models may be trained for different industries, product types, product applications, UX test questions, and/or along other dimensions.

When training different models, the training data may be collected, divided, or otherwise separated across one or more dimensions. For example, expectation elements associated with products in one industry may be separated from quotations associated with products in a different industry. As another example, expectation elements for products targeting businesses consumers in a particular industry may be separated from expectation elements for products targeting retail consumers in the same industry. Conversely, a training dataset may exclude expectation elements that do not align with the context's dimensional boundaries (e.g., the expectation element is from a different industry, product category, consumer group, etc.). In some cases, there may be overlap between the training datasets, and an expectation element may be assigned to more than one group. The dimensional attributes used to group expectation elements may vary from implementation to implementation. The separate training datasets may then be used to train different ML models, which may include transformer language models such as DistilBERT models.

Figure 5:
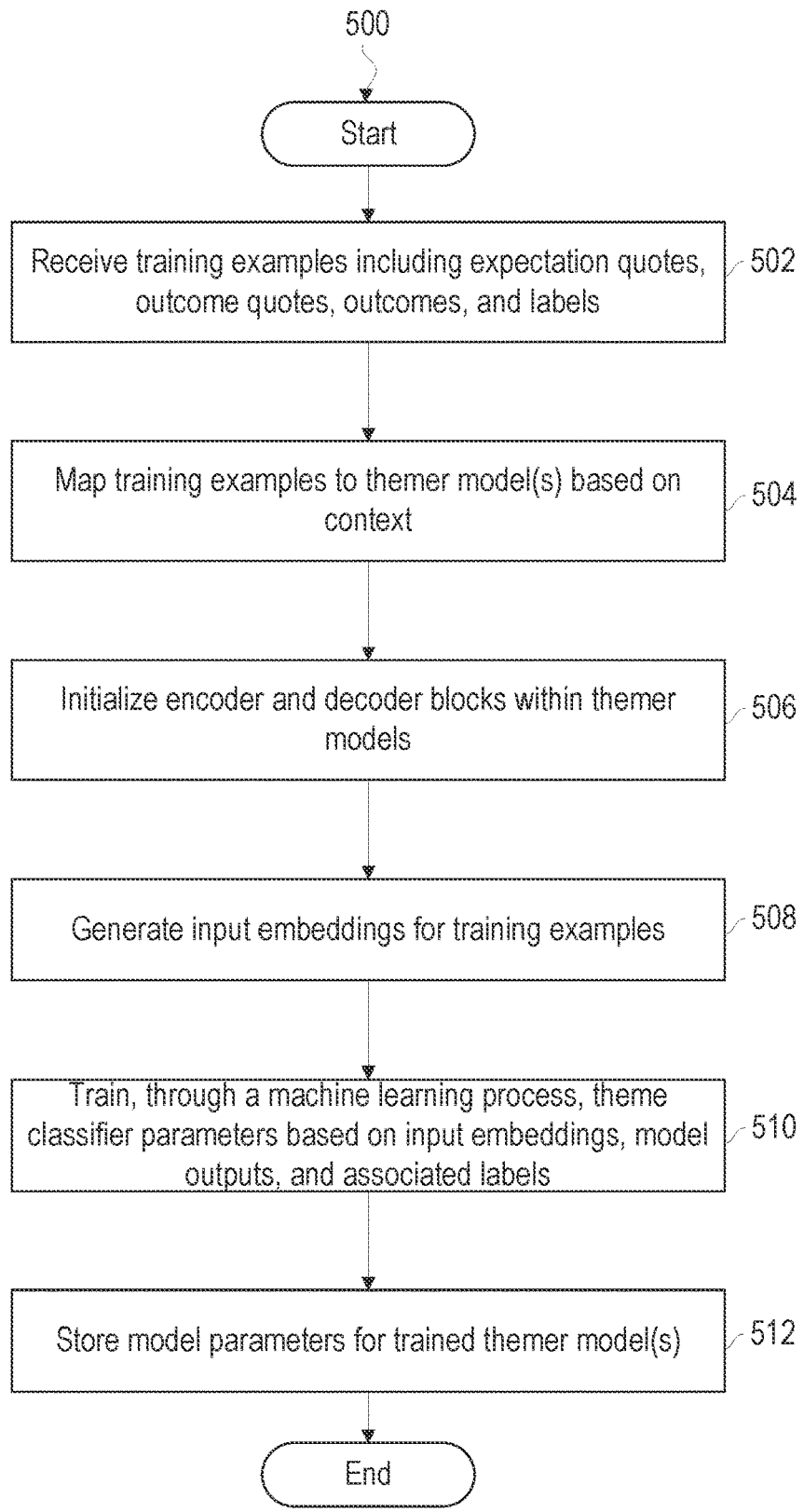
FIG. 5 illustrates a dataflow diagram for maintaining machine learning models in accordance with some embodiments.

FIG. 5 illustrates example process 500 for building a set of models that predict the visibility, quality, and/or relevance of qualitative elements based on training examples grouped by dimensional attributes in accordance with some embodiments. One or more operations illustrated in FIG. 5 may be modified, rearranged, or omitted all together. Accordingly, the particular sequence of operations illustrated in FIG. 5 should not be construed as limiting the scope of one or more embodiments.

At operation 502, process 500 receives a set of training examples including expectation quotes, outcome quotes, outcomes, and labels. A label may include an indication of a theme selected for the example. Additionally or alternatively, the label may include a selection score for the qualitative element for one or more themes.

With supervised and semi-supervised learning, labels may be added or adjusted by an administrator. For example, a user may reassign themes that have been assigned and/or adjust which outcome quotations are visible. As another example, a user may input a selection score based on how relevant the quotation is to a particular context, such as how useful the quotation is for determining product design optimizations and the degree in quality of the quotation's contents. A higher score may reflect a higher selectability or quality. The scoring scale may vary depending on the particular implementation.

At operation 504, process 500 maps the training examples to one or more themer models based on the context. In some embodiments, all expectation elements that share a set of dimensional attributes may be mapped to the same themer while quotations with different dimensional attributes may be mapped to other models. As previously noted, the dimensional attributes that are used to separate expectation elements may vary.

At operation 506, process 500 initializes a set of encoder and decoder blocks within the themer models. Process 500 may randomly initialize the blocks, use configurations from pre-training, or select configurations in any other manner. Encoders may comprise multiple layers, such as a self-attention layer and a feed forward neural network. Encoders may encode a sequence of n-grams within unstructured text based on various attributes, including semantic and syntactic features of the quotations. The encoder may map the input sequence to a context or attention vector based on learned patterns. The encodings may be provided to one or more decoders, which may comprise (a) an attention layer that provides greater weight to portions of an input sequence that are more predictive of the themes and selectability and (b) an output layer that models the conditional probability distribution giving the probabilities that the input vector sequences are associated with different themes within a schema.

At operation 508, process 500 generates input embeddings for the training examples. In some embodiments, process 500 generates an embedding for an example by tokenizing the quotations and converting each token into a machine learning vector according to a word embedding model. Process 500 may further add a positional encoding with each word embedding that indicates word positions within a quotation.

At operation 510, process 500 trains, through a machine learning process, the encoder and/or decoder block(s) based on the input embeddings, model output(s), and associated labels. In some embodiments, process 500 determines residuals between the transformer language model prediction output for quotations within the dataset and the label for the example. For example, process 500 may compute a difference between predicted selection scores and observed selection scores. As another example, process 500 may determine the difference between the predicted theme distributions and the observed theme distributions for set of test data.

Based on the residuals, process 500 may then adjust the model parameters, including parameters of the encoders and/or decoders, to minimize a loss function. For instance, a model may train and tune a neural network in an encoder and/or decoder using backpropagation. Backpropagation is a process of updating cell states in the neural network based on gradients determined as a function of the estimation error. With backpropagation, nodes are assigned a fraction of the estimated error based on the contribution to the output, and the node parameters (e.g., weights, bias values) may be adjusted based on the fraction. Thus, the weights of the connections between cells of a neural network may be adjusted in an unsupervised manner. Additionally or alternatively, connections may be added and/or removed between cells based on the estimation error. The adjustments may be made to reduce and minimize the estimation error of the model. In other embodiments, the process may use other machine learning algorithms to train and tune model parameters, such as regression analysis or other methods based on gradient descent.

At operation 512, process 500 stores the model parameters for the trained themer model(s). In some embodiments, process 500 stores the encoder and decoder configurations for different transformers, where each transformer is mapped to a different set of one or more dimensional attribute values. Different ML models may pick up on different patterns within the different datasets that affect the ML model predictions. For example, a particular sequence of tokens may increase the selectability score and/or theme with one model but not another model. Additionally or alternatively, other patterns may impact the predicted differently in different contexts. Thus, when the same expectation element is fed to different ML models, the resulting predictions may vary, including the predicted themes and selectability for the specific context.

In some embodiments, a maximum lookback may be applied during the training process. For example, expectation elements that are from UX test results older than a threshold age (e.g., six months, one year, etc.) may be filtered from the training dataset. When the model is fine-tuned, the training process does not consider data older than the maximum lookback age threshold. Thus, training may be local in time, allowing the themer to "forget" older patterns and quickly adapt to evolving UX expectations. However, in other embodiments, the training data may include all historical data or may time-weight the historical data such that more recent data is given greater weight when training the ML models.

In some embodiments, ML model predictions and parameters may be adjusted based on a feedback loop. The feedback may include input from system administrators and/or end users viewing the predictions. For example, an analyst may adjust a visibility, quality, or relevance score of a given quotation. Additionally or alternatively, the analyst may change the distribution of which quotations are visible and which quotations are hidden. The results may be compared with predictions to determine a model estimation error. Based on the error, adjustments may be made to the model weights and/or other parameters to improve model robustness and accuracy.

Figure 6:
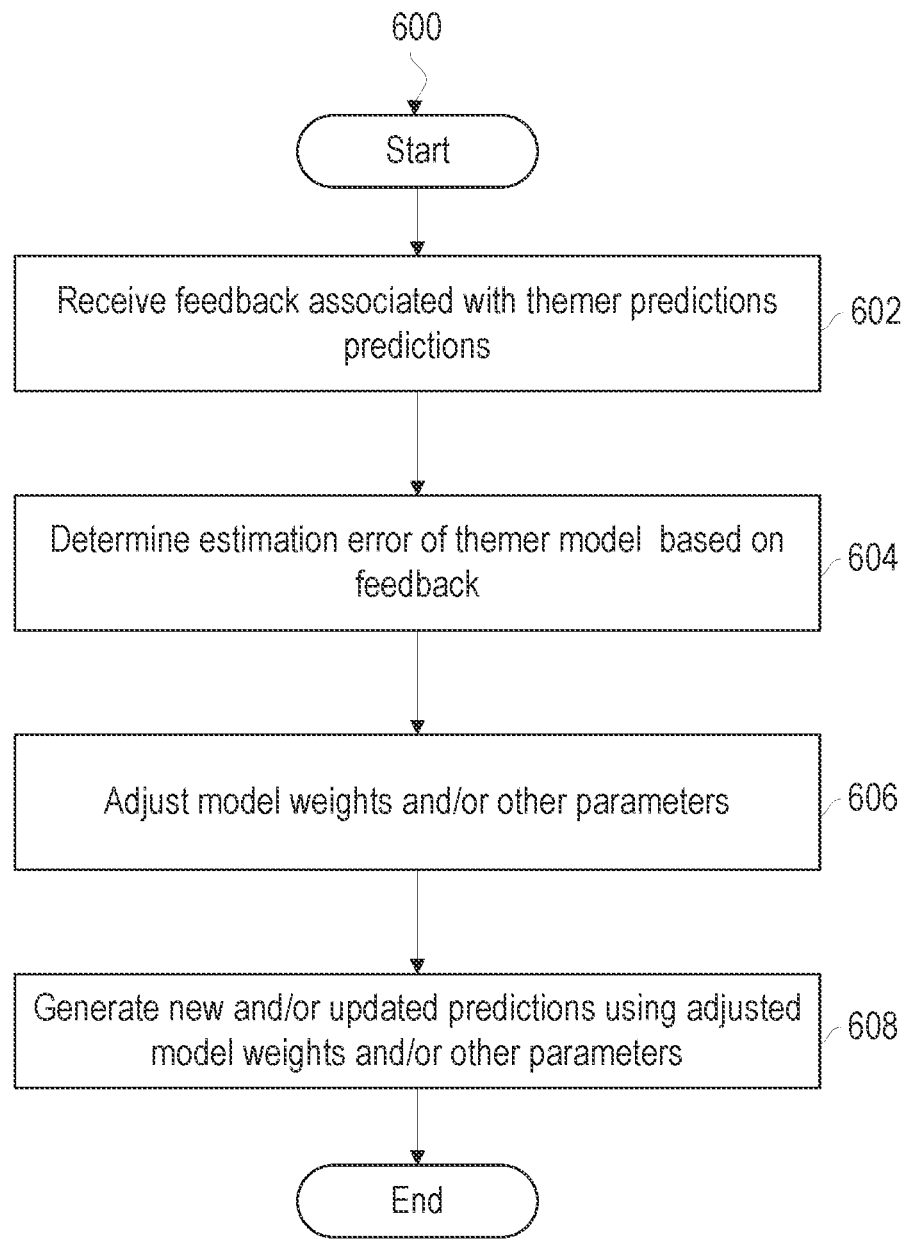
FIG. 6 illustrates a process for tuning machine learning models in accordance with some embodiments.

FIG. 6 illustrates process 600 for tuning machine learning models in accordance with some embodiments. One or more operations illustrated in FIG. 6 may be modified, rearranged, or omitted all together. Accordingly, the particular sequence of operations illustrated in FIG. 6 should not be construed as limiting the scope of one or more embodiments.

At operation 602, process 600 includes receiving feedback associated with one or more predictions output by a ML model, such as a translator language model. In some embodiments, the feedback comprises adjustments to a visibility, quality, or relevance score. For example, an analyst may increase or decrease the score predicted for the quotation. Additionally or alternatively, the feedback may comprise an updated distribution of which qualitative elements from a set of UX test results are visible and hidden.

At operation 604, process 600 determines an estimation error of the model based on the received feedback. The estimation error may be determined by computing a difference between the adjusted and predicted value of a score. Additionally or alternatively, the estimation error may be determined based on a difference between the predicted and observed visibility distributions for set of UX test results.

At operation 606, process 600 adjusts the model weights and/or other parameters based on the estimation error. For instance, a model may train and tune a neural network using backpropagation. As previously noted, backpropagation is a process of updating cell states in the neural network based on gradients determined as a function of the estimation error. In other embodiments, the process may use other machine learning algorithms to train and tune model parameters, such as regression analysis or other methods based on gradient descent.

At operation 608, process 600 generates new and/or updated predictions using the adjusted model weights and/or other parameters. For example, cell weights within a neural network of an encoder and/or decoder block may be adjusted. Additionally or alternatively, parameters of the attention layer and/or other configurations of the various blocks may be tuned.

In some embodiments, the set of ML models may be retrained periodically to forget older data. For example, the training process depicted in FIG. 6 may be executed monthly using only UX test results that have been received within a threshold timeframe. This allows the predictions to adapt more quickly to trending and evolving standards. However, in other embodiments, the training process may use all available historical data during training. The data may be time-weighted to reduce the impact of older data on the learning process, or the data may be equally weighted.

In some embodiments, the tuning and/or training processes described herein may use pretrained models. For example, a pretrained DistilBERT model may be used to reduce the processing overhead associated with building the themer models.

In some embodiments, when (a) a test is completed, (b) there is an existing themer for the test context, and (c) there are no new themes in a completed test, the existing themer model is fine-tuned on historical and newly contributed data. Fine-tuning the themer in this manner allows the model to converge over time. If a new theme is present or explicitly triggered by the theme builder tool, a pretrained model may be fetched and fine-tuned on the available data. This mode allows the themer to learn new themes and have a reset path in case overtraining occurs.

In some embodiments, ML engine 126 may be configured to use the most recently published models available. Thus, when respondent data is available for a particular UX text, the latest themer models for that context are applied to generate predictions and render the user interface. There may be automated and/or manual update triggers that result in publication of the new models. For example, a routine may trigger an update automatically each time a new UX test is complete. Additionally or alternatively, updates may be explicitly requested by an analyst or other end user.

6. Example User Interface for Building and Modifying Themes

As previously noted, a theme builder tool may include an interface that allows users to set the labels of the data in an active test and/or update historical tests. For example, users may define new themes within a schema, modify existing themes, delete themes, and/or relabel theme assignments. The theme builder may further allow the user to modify the representative quotes for theme outcomes and/or modify the visible quotes that were selected by the generative language model. The feedback may be used to retrain and/or fine-tune the model, such as by executing process 500 and/or process 600.

Figure 7:
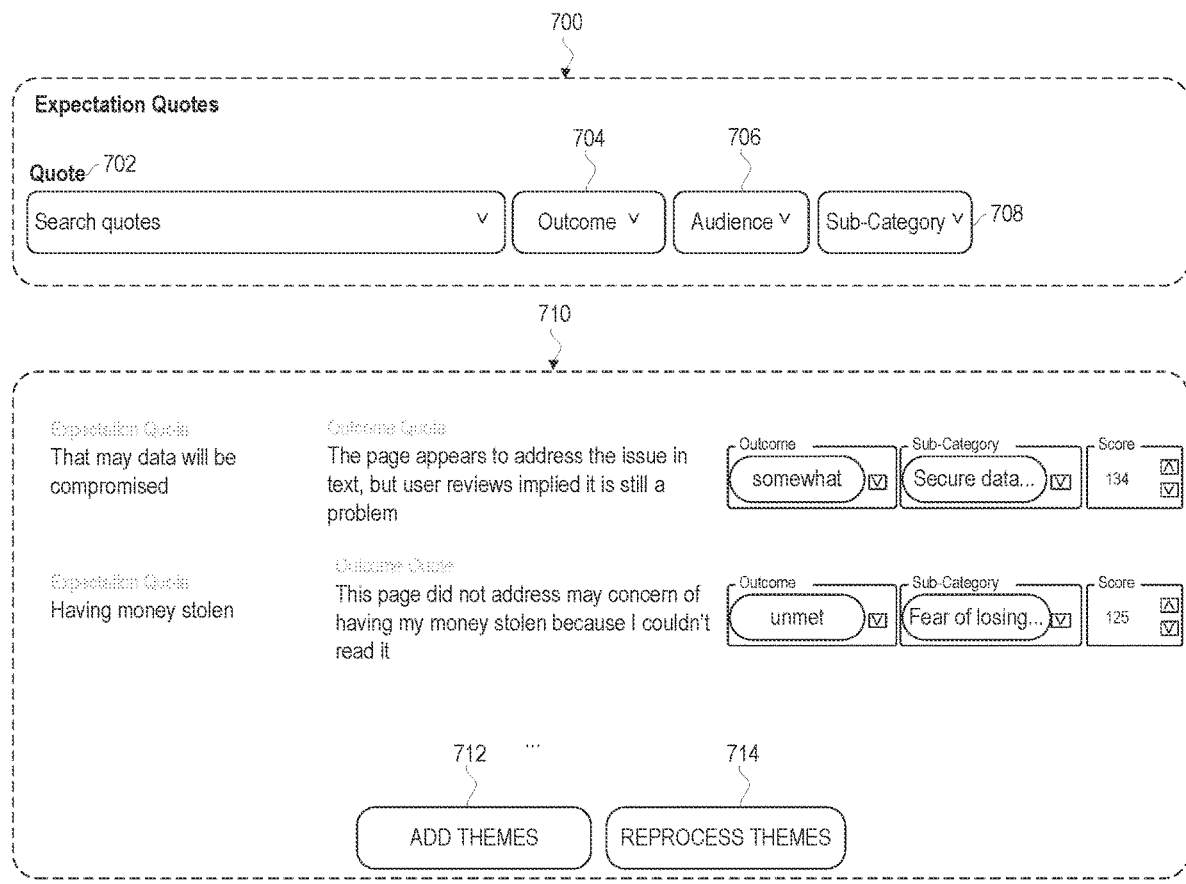
FIG. 7 illustrates a user interface for providing feedback and updating model predictions in accordance with some embodiments.

FIG. 7 illustrates a user interface for providing feedback and updating model predictions in accordance with some embodiments. Query interface 700 includes search bar 702, outcome filter 704, audience filter 706, and sub-category filter 708. Users may input one or more keywords into search bar 702 to search for expectation and/or outcome quotes in the test result data. The outcome filter 704 may restrict the search to expectation elements with a particular outcome (e.g., met, somewhat met, unmet). Audience filter 706 may restrict the results to quotations authored by respondents with specified attributes, such as within a specified age range, income range, education, etc. Sub-category filter may direct the search to expectation elements assigned to one or more themes.

The search results are displayed in display area 710. Each result corresponds to an expectation element that matches the search criteria and filters. Each result includes an expectation quote describing a user expectation (e.g., "That may data will be compromised"), an outcome quote (e.g., "The page appears to address the issue in text, but user reviews implied it was still a problem") an outcome (e.g., "Somewhat met") a theme (e.g., "Data security"), and a selection score (e.g., "134"). The user may interact with the user interface to change the outcome, theme, and/or selection score for one or more expectation elements.

Display area 710 further includes buttons 712 and 714 to modify and reprocess themes. For example, a user may select button 712 to add, remove and/or modify themes from the schema. In response to selecting button 712, the user may be presented with a list of themes defined for the context-specific schema. The user interface may include an input field to add a new theme label/classifier to the schema. Once added, the user may reassign one or more expectation elements to the new theme.

After updating the schema, theme assignments, and/or selection scores, a user may select button 714 to reprocess the theme based on the feedback. In response, the interface may invoke the training and/or tuning process described above to retrain and/or fine-tune the underlying ML models. The user may navigate to the interface depicted in FIG. 3 to view updated themes and/or representative outcome quotations using the new themer model parameters. When the user selects button 714, any new UX test data that was received and not previously incorporated into the synthesized results may be included when the updated ML models are applied.

7. Recommendations and Additional Applications

In some embodiments, the system may provide recommendations and/or trigger actions directed to optimizing a product based on the theme predictions and/or selected expectation elements. The recommendations and/or actions that are triggered may vary depending on which quotations are included in the set. For instance, responsive to detecting the quotations presented in display area 302 of FIG. 3, recommendation engine 114 may present, via frontend interface 112, recommended changes to add a virtualization option to a product webpage that allows users to virtually try on a product. Recommendation engine 114 may parse the result set to identify commonalities in the quotations and present the top recommended actions based on which design changes are most frequently suggested. Recommendation engine 114 may limit the analysis for commonalities to the representative quotations selected by the generative language model. By limiting the analysis to the highest quality expectation elements, processing overhead on the system may be reduced while the overall insight quality is improved.

Additionally or alternatively, the system may populate an analyst's work queue based on the qualitative elements from the final visible or relevant. Analysts for third-party service providers often review the results of UX tests before sending synthesized results to the product design team which hired the analysts. The theme prediction and curating agents may reduce the analyst's workload and turnaround time by predicting the themes most relevant to a product and hiding extraneous results. For example, an analyst may be presented with the top n highest quality outcome quotes to review rather than having to manually sift through thousands of results.

Additionally or alternatively, expectation elements may be sorted and presented by score. For example, a list presented to an analyst may include quotations predicted to be the highest quality at the top with lower-quality quotes closer to the bottom. Quotations scored below a threshold selection score may be cutoff or presented at the end of the list. Thus, quotations that provide the most helpful insights may be presented more prominently than those with little or no useful information.

Additionally or alternatively, the themer and curating agent outputs may be consumed by other downstream applications, which may process the data to perform additional analytics and/or trigger additional actions. For example, downstream applications may search for patterns in the selected quotations to formulate predictions, recommendations, and/or other analytic insights. The applications may further execute actions based on the set of quotations such as updating user interface 104, functional elements 106, and/or aesthetic elements 108 in a manner that is predicted to improve the user experience test results.

8. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using Hypertext Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

10. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
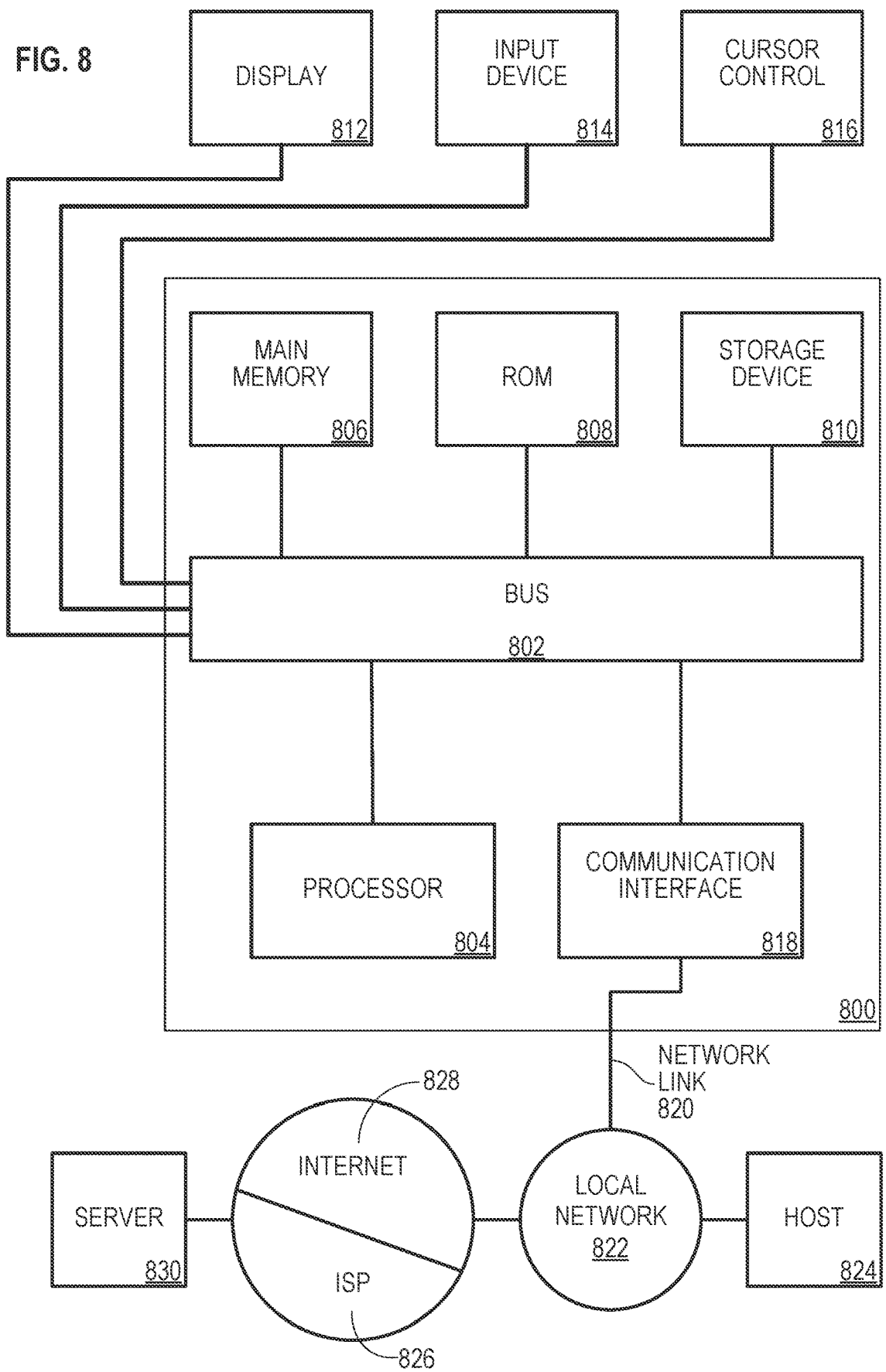
FIG. 8 illustrates a computer system in accordance with some embodiments.

For example, FIG. 8 illustrates a computer system in accordance with some embodiments. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

11. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving data that includes a plurality of unstructured textual elements;
generating, by a machine learning classification model, a set of theme assignments for at least a subset of the unstructured textual elements, wherein the set of theme assignments map each unstructured textual element of the subset to one or more themes from a theme schema;
sending the set of theme assignments to a generative language model for review;
updating at least one theme assignment made by the machine learning classification model based at least in part on an output of the generative language model; and
sending a second prompt to at least one of the generative language model or a second generative language model to select representative quotes for at least a first outcome and second outcome associated with a first theme, wherein the second prompt is generated based at least in part on the output of the generative language model.

2. The method of claim 1, further comprising: tuning or retraining the machine learning classification model based at least in part on the output of the generative language model.

3. The method of claim 1, wherein updating the at least one theme assignment comprises: removing the at least one theme assignment based at least in part on the output of the generative language model such that at least one of the subset of the unstructured textual elements is unclassified.

4. The method of claim 1, wherein updating the at least one theme assignment comprises: reassigning at least one unstructured textual element to a different theme in the theme schema.

5. The method of claim 1, further comprising: presenting, within a user interface, at least one theme from the theme schema and at least one respective outcome for at least one expectation element mapped to the at least one theme by the machine learning classification model, wherein the respective outcome is selected to present in the user interface based at least in part on a second output of the generative language model or the second generative language model that selects the representative quotes.

6. The method of claim 1, wherein sending the set of theme assignments to the generative language model for review comprises generating at least one input prompt that includes a set of expectation elements from a user experience test that were assigned a particular theme; wherein the prompt includes a request for the generative language model to identify which expectations elements to unassign from the particular theme.

7. The method of claim 1, wherein the plurality of unstructured textual elements include expectation quotes and outcome quotes; wherein the set of theme assignments identify predicted themes from the theme schema that are distributed in the expectation quotes; the method further comprising: determining a distribution of outcomes associated with at least a subset of the predicted themes.

8. The method of claim 1, further comprising: configuring a first agent and a second agent using at least one generative language model service; wherein the first agent is configured to review and edit outputs of the machine learning classification model; wherein the second agent is configured to select representative unstructured text based at least in part on the outputs of the machine learning classification model reviewed by the first agent.

9. The method of claim 1, further comprising: determining, based on the output of the generative language model, at least one insight associated with optimizing a product design; and presenting, through a user interface of a product analytics applications, the at least one insight to an analyst or product designer.

10. One or more non-transitory computer-readable media storing instructions which, when executed by one or more hardware processors cause:
receiving data that includes a plurality of unstructured textual elements;
generating, by a machine learning classification model, a set of theme assignments for at least a subset of the unstructured textual elements, wherein the set of theme assignments map each unstructured textual element of the subset to one or more themes from a theme schema;
sending the set of theme assignments to a generative language model for review;
updating at least one theme assignment made by the machine learning classification model based at least in part on an output of the generative language model; and
sending a second prompt to at least one of the generative language model or a second generative language model to select representative quotes for at least a first outcome and second outcome associated with a first theme, wherein the second prompt is generated based at least in part on the output of the generative language model.

11. The media of claim 10, wherein the instructions further cause: tuning or retraining the machine learning classification model based at least in part on the output of the generative language model.

12. The media of claim 10, wherein updating the at least one theme assignment comprises: removing the at least one theme assignment based at least in part on the output of the generative language model such that at least one of the subset of the unstructured textual elements is unclassified.

13. The media of claim 10, wherein updating the at least one theme assignment comprises: reassigning at least one unstructured textual element to a different theme in the theme schema.

14. The media of claim 10, wherein the instructions further cause: presenting, within a user interface, at least one theme from the theme schema and at least one respective outcome for at least one expectation element mapped to the at least one theme by the machine learning classification model, wherein the respective outcome is selected to present in the user interface based at least in part on a second output of the generative language model or the second generative language model that selects the representative quotes.

15. The media of claim 10, wherein sending the set of theme assignments to the generative language model for review comprises generating at least one input prompt that includes a set of expectation elements from a user experience test that were assigned a particular theme; wherein the prompt includes a request for the generative language model to identify which expectations elements to unassign from the particular theme.

16. The media of claim 10, wherein the plurality of unstructured textual elements include expectation quotes and outcome quotes; wherein the set of theme assignments identify predicted themes from the theme schema that are distributed in the expectation quotes; wherein the instructions further cause: determining a distribution of outcomes associated with at least a subset of the predicted themes.

17. The media of claim 10, wherein the instructions further cause: configuring a first agent and a second agent using at least one generative language model service; wherein the first agent is configured to review and edit outputs of the machine learning classification model; wherein the second agent is configured to select representative unstructured text based at least in part on the outputs of the machine learning classification model reviewed by the first agent.

18. The media of claim 10, wherein the instructions further cause: determining, based on the output of the generative language model, at least one insight associated with optimizing a product design; and presenting, through a user interface of a product analytics applications, the at least one insight to an analyst or product designer.

19. A system comprising:
one or more hardware processors;
one or more non-transitory computer-readable media storing instructions which, when executed by the one or more hardware processors cause:
receiving data that includes a plurality of unstructured textual elements;
generating, by a machine learning classification model, a set of theme assignments for at least a subset of the unstructured textual elements, wherein the set of theme assignments map each unstructured textual element of the subset to one or more themes from a theme schema;
sending the set of theme assignments to a generative language model for review;
updating at least one theme assignment made by the machine learning classification model based at least in part on an output of the generative language model; and
sending a second prompt to at least one of the generative language model or a second generative language model to select representative quotes for at least a first outcome and second outcome associated with a first theme, wherein the second prompt is generated based at least in part on the output of the generative language model.

20. The system of claim 19, wherein the instructions further cause: tuning or retraining the machine learning classification model based at least in part on the output of the generative language model.

* * * * *